(12) United States Patent
Nakamoto et al.

(10) Patent No.: US 11,145,940 B2
(45) Date of Patent: Oct. 12, 2021

(54) SPACER AND BATTERY PACK

(71) Applicant: Nissan Motor Co., Ltd., Yokohama (JP)

(72) Inventors: Masahiro Nakamoto, Kanagawa (JP); Yasuhiro Yanagihara, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 77 days.

(21) Appl. No.: 16/336,125

(22) PCT Filed: Aug. 30, 2017

(86) PCT No.: PCT/JP2017/031234
§ 371 (c)(1),
(2) Date: Mar. 25, 2019

(87) PCT Pub. No.: WO2018/056011
PCT Pub. Date: Mar. 29, 2018

(65) Prior Publication Data
US 2019/0214624 A1    Jul. 11, 2019

(30) Foreign Application Priority Data

Sep. 26, 2016   (JP) .............................. JP2016-187481

(51) Int. Cl.
| | |
|---|---|
| *H01M 50/20* | (2021.01) |
| *H01M 50/54* | (2021.01) |
| *H01M 10/48* | (2006.01) |
| *H01M 50/10* | (2021.01) |
| *H01M 50/50* | (2021.01) |

(Continued)

(52) U.S. Cl.
CPC ......... *H01M 50/54* (2021.01); *H01M 10/482* (2013.01); *H01M 50/10* (2021.01); *H01M 50/20* (2021.01); *H01M 50/50* (2021.01); *H01M 50/502* (2021.01); *H01M 50/543* (2021.01);

(Continued)

(58) Field of Classification Search
None
See application file for complete search history.

(56) References Cited

U.S. PATENT DOCUMENTS

2010/0304203 A1* 12/2010 Buck .................... H01M 2/1072
429/120
2012/0288740 A1* 11/2012 Byun .................... H01M 2/342
429/96

(Continued)

FOREIGN PATENT DOCUMENTS

| | | |
|---|---|---|
| CN | 101855775 A | 10/2010 |
| EP | 1 798 787 A2 | 6/2007 |

(Continued)

*Primary Examiner* — Haixia Zhang
(74) *Attorney, Agent, or Firm* — Global IP Counselors, LLP

(57) ABSTRACT

A spacer is used with a unit cell that has a cell body including a power-generating element and formed to have a flat shape and an electrode tab extending out from the cell body. The first spacer has a protrusion, a recess, and an opening. The protrusion has a protruding shape and is inserted into a hole or notch provided on the electrode tab to guide the electrode tab. The first recess has a recessed shape, and is separated from the electrode tab around the base of the protrusion. The first opening allows a portion of the first recess to communicate with a side surface of the spacer.

4 Claims, 8 Drawing Sheets

(51) Int. Cl.
    *H01M 50/502* (2021.01)
    *H01M 50/543* (2021.01)
    *H01M 50/572* (2021.01)

(52) U.S. Cl.
    CPC ...... *H01M 50/572* (2021.01); *H01M 2220/20* (2013.01)

(56) References Cited

U.S. PATENT DOCUMENTS

2014/0272495 A1* 9/2014 Silk .................. B60L 58/21
                                                    429/72
2016/0248062 A1* 8/2016 Lee .................. H01M 2/30

FOREIGN PATENT DOCUMENTS

| EP | 2 693 520 A1 | 2/2014 |
| EP | 3 062 364 A1 | 8/2016 |
| JP | 2007-503690 A | 2/2007 |
| JP | 2007-172893 A | 7/2007 |
| JP | 2009-231267 A | 10/2009 |
| JP | 2012-123980 A | 6/2012 |
| KR | 10-2005-0060187 A | 6/2005 |
| KR | 10-2012-0037018 A | 4/2012 |
| KR | 10-2016-0066919 A | 6/2016 |
| WO | 2015/133308 A1 | 9/2015 |
| WO | 2017/068703 A1 | 4/2017 |

* cited by examiner

SPACER AND BATTERY PACK

CROSS-REFERENCE TO RELATED APPLICATIONS

This application is a U.S. national stage application of International Application No. PCT/JP2017/031234, filed on Aug. 30, 2017, which claims priority to Japanese Patent Application No. 2016-187481, filed on Sep. 26, 2016.

BACKGROUND

Technical Field

The present invention relates to a spacer and a battery pack.

Background Information

Conventionally, there has been a battery pack that is, for example, mounted in a vehicle such as an electric vehicle and used as a power source for driving a vehicle motor. A battery pack (one form of which is a battery module) is configured by stacking unit cells (flat-type batteries) using spacers (insulating plates) (for example, see Japanese Laid-Open Patent Application No. 2009-231267 referred to hereinafter as Patent Document 1).

SUMMARY

In the battery pack, there is the risk that water droplets or water film generated due to condensation will accumulate between, for example, the unit cells and the spacers. Water droplets and water film cause electric leakage due to the electrical short-circuiting between the members constituting the battery pack.

An object of the present invention is to provide a spacer and a battery pack that can suppress electric leakage caused by condensation.

A spacer which achieves the object described above is used in a unit cell that has a cell body, which includes a power-generating element and is formed in a flat shape, and an electrode tab, which is drawn out from the cell body. The spacer has a protrusion, a recess, and an opening. The protrusion has a protruding shape and is inserted into a hole or notch provided on the electrode tab to guide the electrode tab. The recess has a recessed shape, and is separated from the electrode tab around the base of the protrusion. The opening allows a portion of the recess to communicate with a side surface.

The battery pack which achieves the object described above comprises a unit cell, a spacer, and a bus bar. The unit cell comprises a cell body, which includes a power generation element, and an electrode tab drawn out from the cell body. The spacer includes the protrusion formed with the protruding shape and inserted into a hole or notch provided on the electrode tab to guide the electrode tab, the recess formed with the recessed shape formed so as to be separated from the electrode tab around the base of the protrusion, and the opening that allows a portion of the recess to communicate with the side surface. The bus bar electrically interconnects the electrode tabs of the different unit cells.

DETAILED DESCRIPTION OF THE EMBODIMENTS

Figure 1:
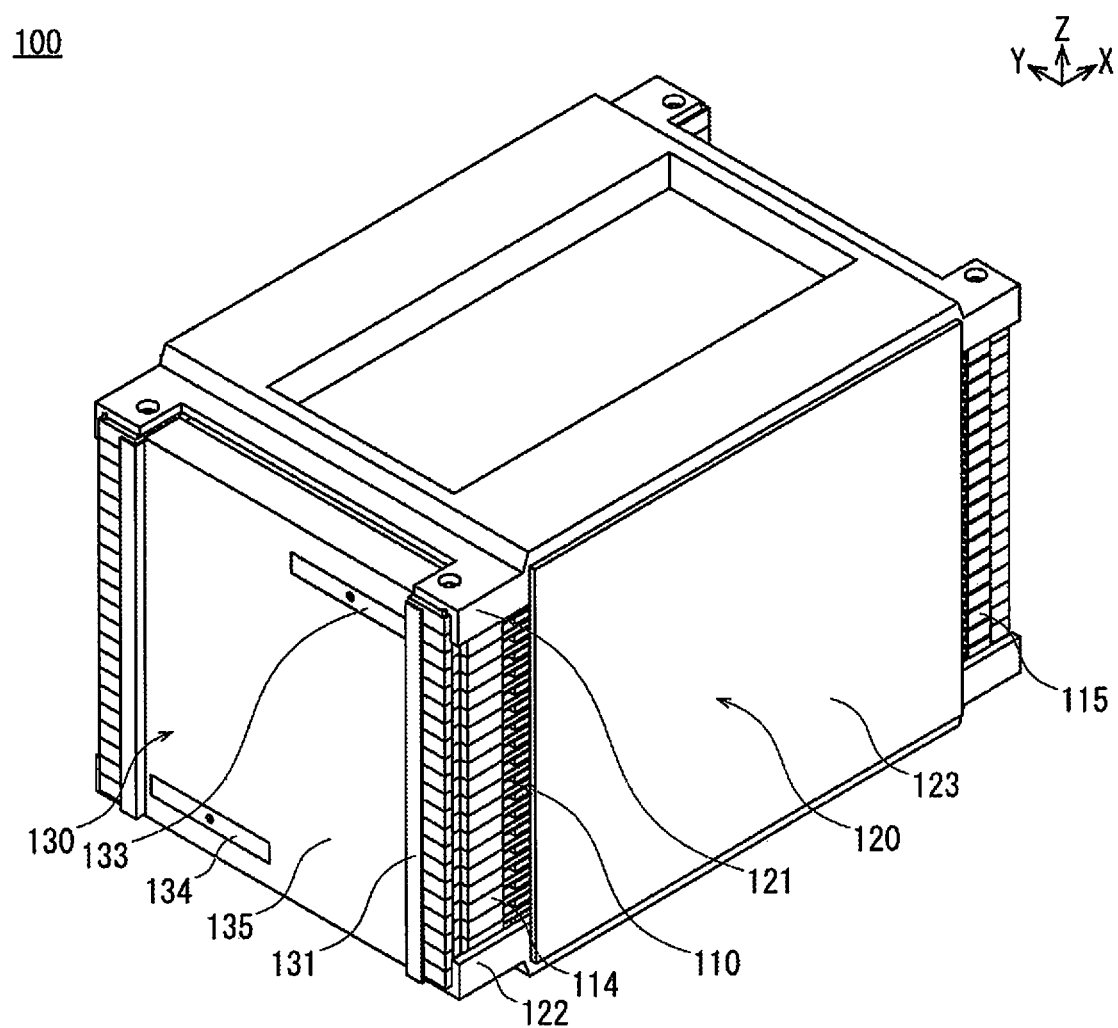
FIG. 1 is a perspective view illustrating a battery pack according to an embodiment.

An embodiment of the present invention will be explained below with reference to the appended drawings. In the drawings, the same members have been assigned the same reference symbols and redundant explanations have been omitted. In the drawings, the sizes and proportions of the members have been exaggerated for ease of understanding the embodiment, and may differ from the actual sizes and proportions.

The orientation of a battery pack 100 is shown using arrows indicated by X, Y, and Z in each of the drawings. The direction of the arrow indicated by X is the longitudinal direction of the battery pack 100. The direction of the arrow indicated by Y is the transverse direction of the battery pack 100. The direction of the arrow indicated by Z is the stacking direction of the battery pack 100.

Figure 2:
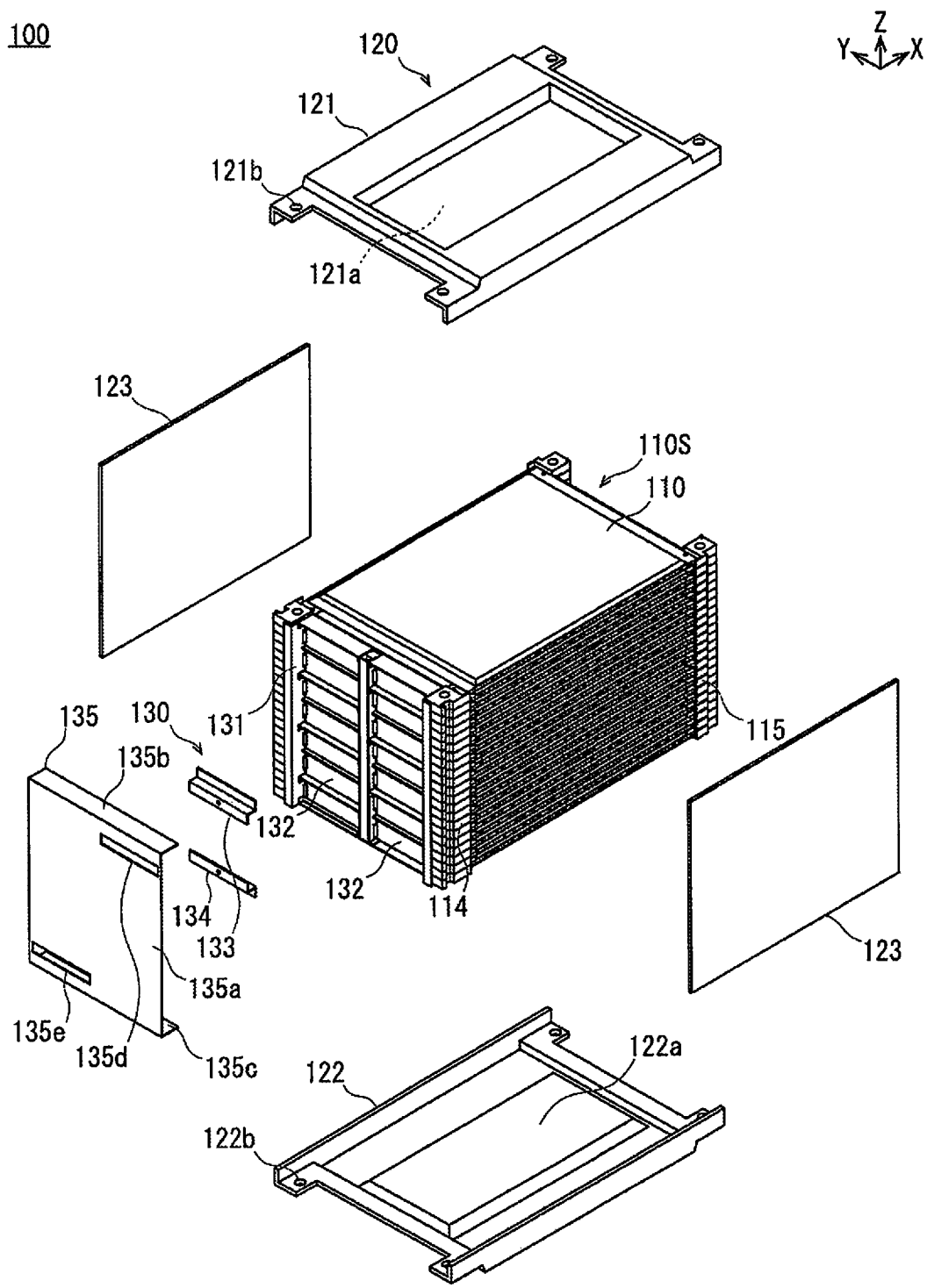
FIG. 2 is a perspective view illustrating a state in which a portion of a bus bar unit (a protective cover, an anode side terminal, and a cathode side terminal) as well as a pressurizing unit (an upper pressure plate, a lower pressure plate, and left and right side plates) are removed from the battery pack shown in FIG. 1.
Figure 3A:
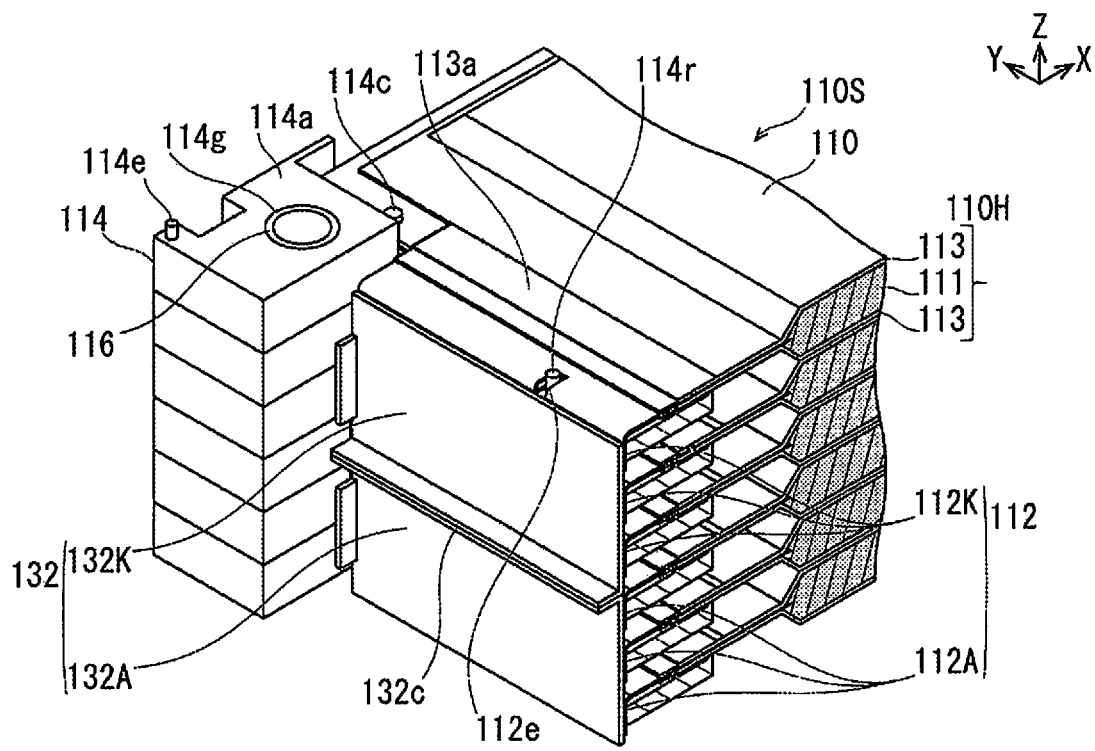
FIG. 3A is a perspective view illustrating a cross section of a main part of a state in which a bus bar is joined to electrode tabs of stacked unit cells.
Figure 3B:
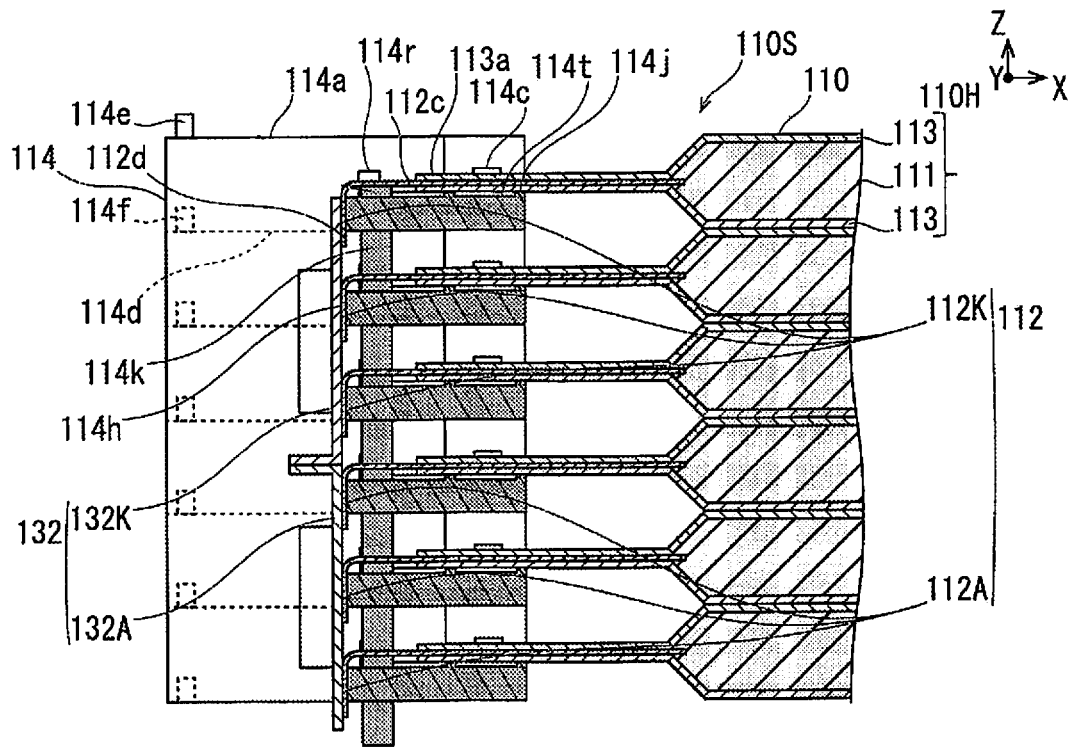
FIG. 3B is an end surface view illustrating FIG. 3A from the side.
Figure 4:
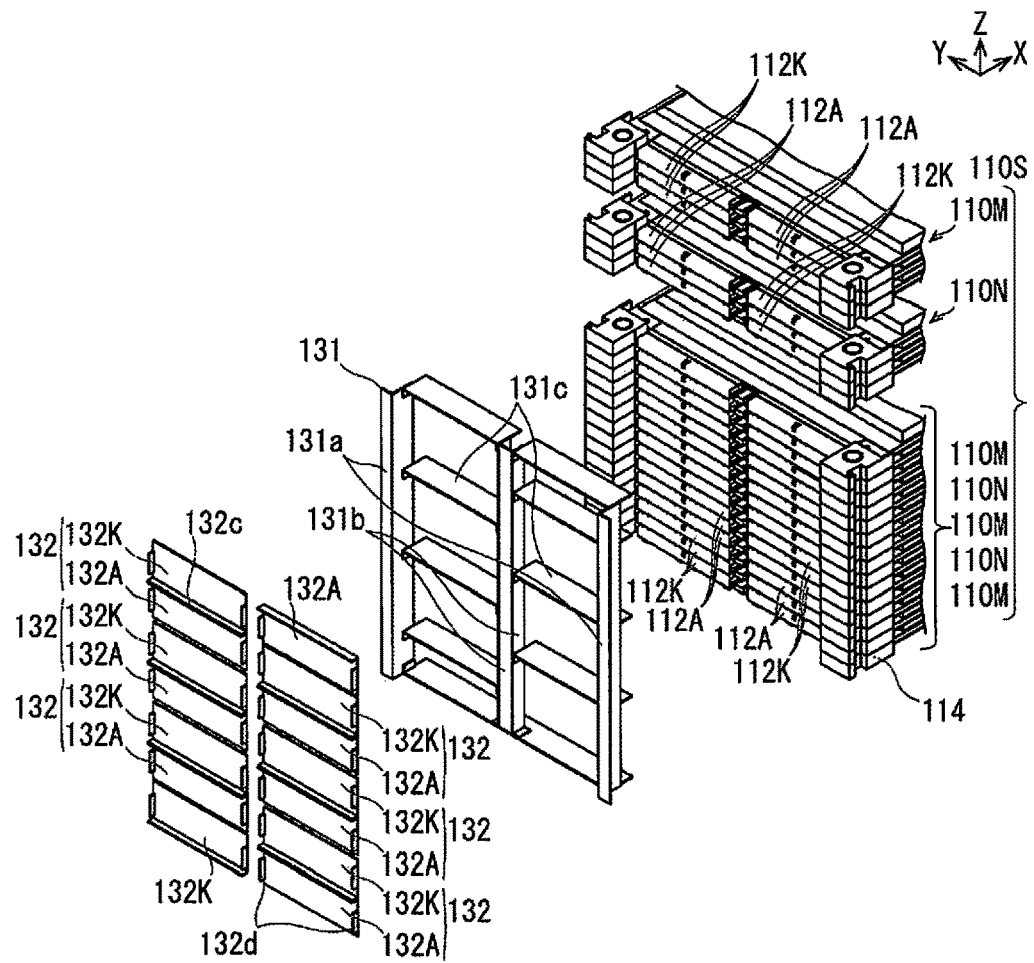
FIG. 4 is a perspective view illustrating a state in which a bus bar holder and the bus bars are removed from the stacked body illustrated in FIG. 2.
Figure 5:
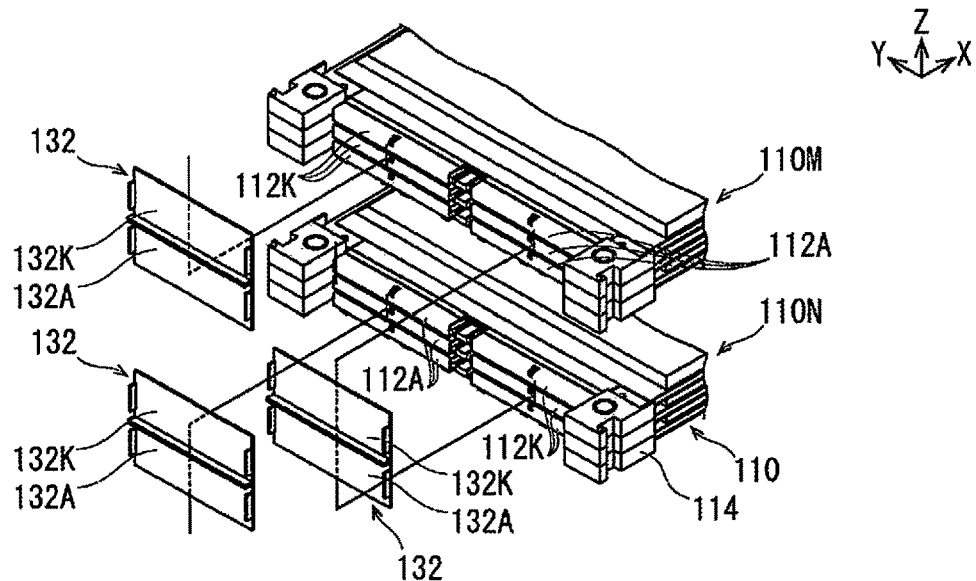
FIG. 5 is a perspective view illustrating a state in which a first cell sub-assembly and a second cell sub-assembly shown in FIG. 4 are electrically connected by means of bus bars.
Figure 6:
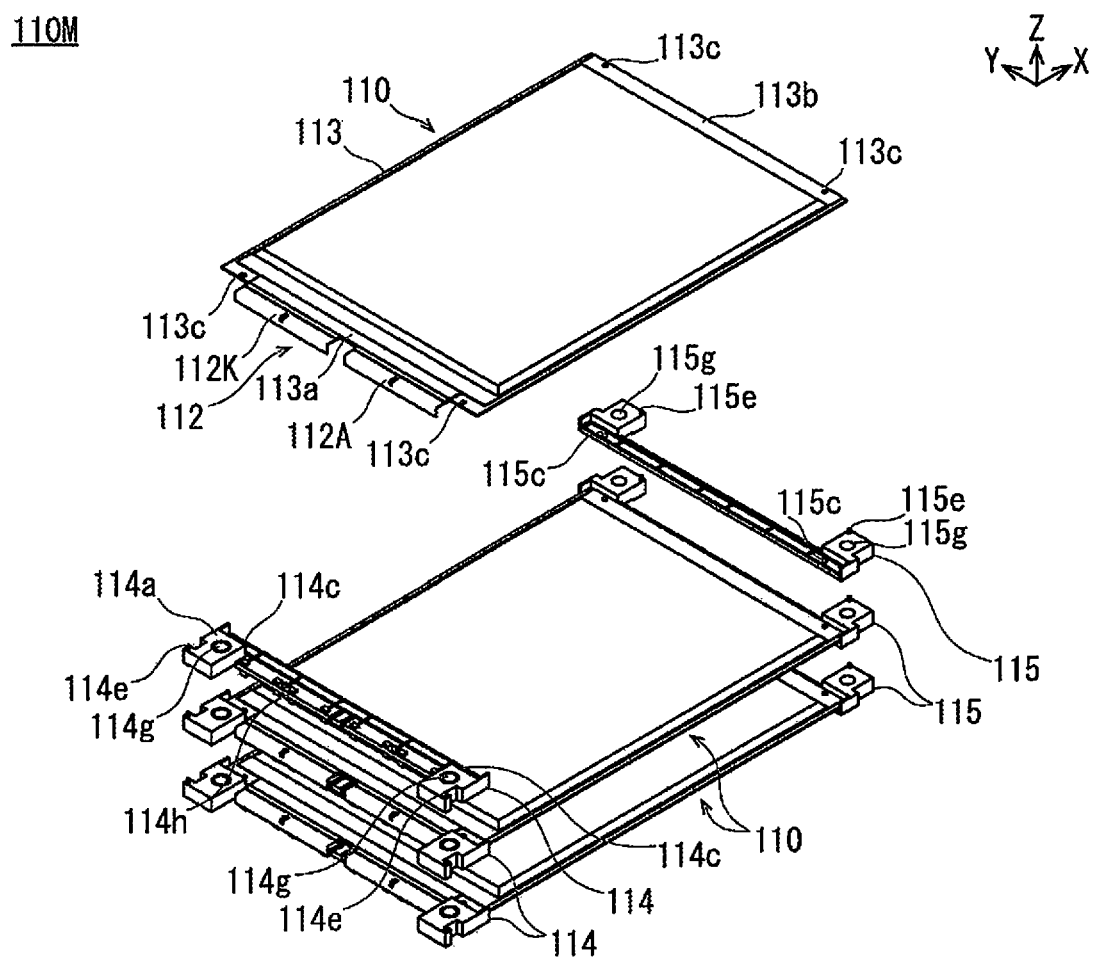
FIG. 6 is a perspective view illustrating a state in which the first cell sub-assembly (three sets of unit cells that are connected in parallel) shown in FIG. 4 is disassembled for each unit cell, and a first spacer and a second spacer are removed from one (the uppermost) unit cell thereof.
Figure 7:
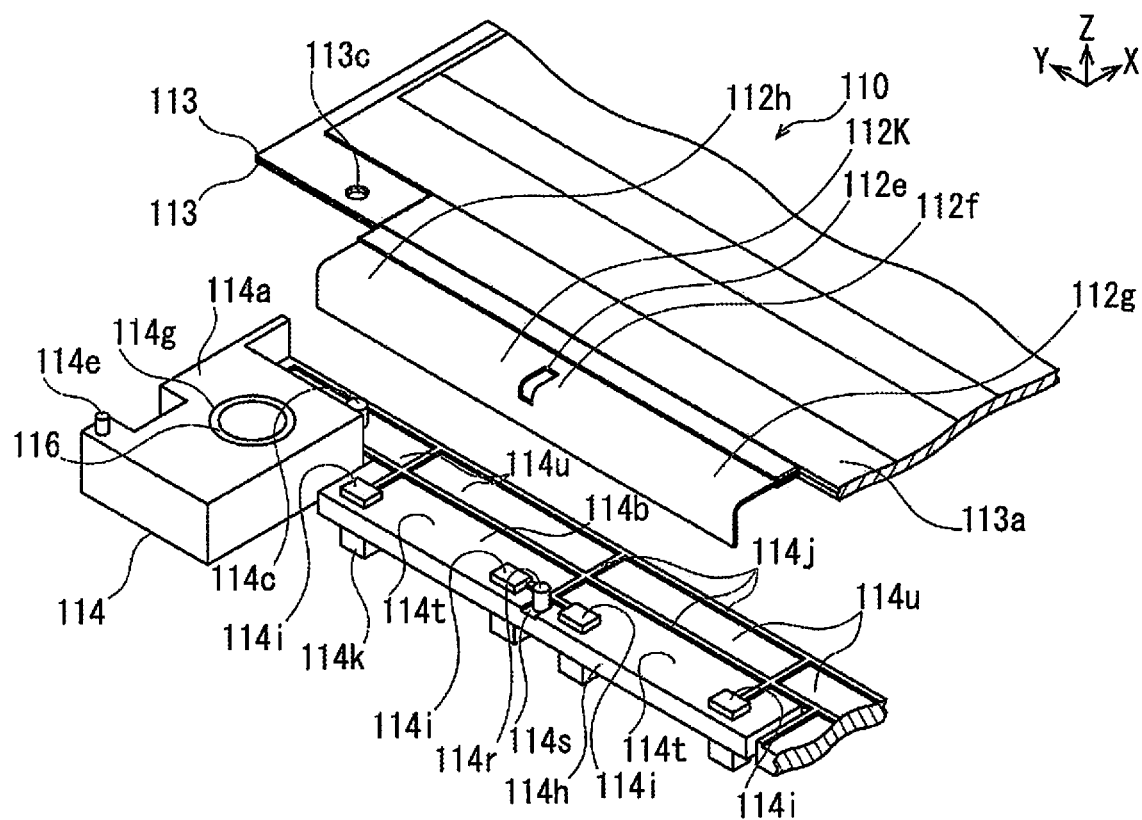
FIG. 7 is a perspective view illustrating a portion of the unit cell and a portion of the first spacer.
Figure 8:
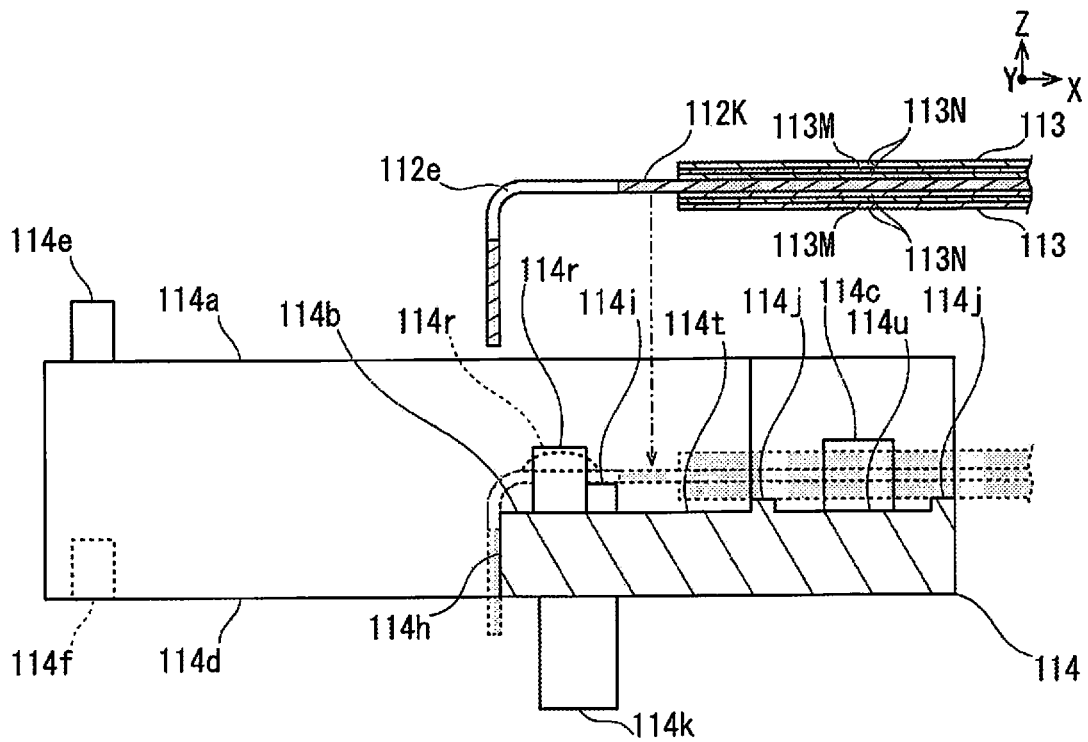
FIG. 8 is a side view illustrating the unit cell and the first spacer of FIG. 7.
Figure 9:
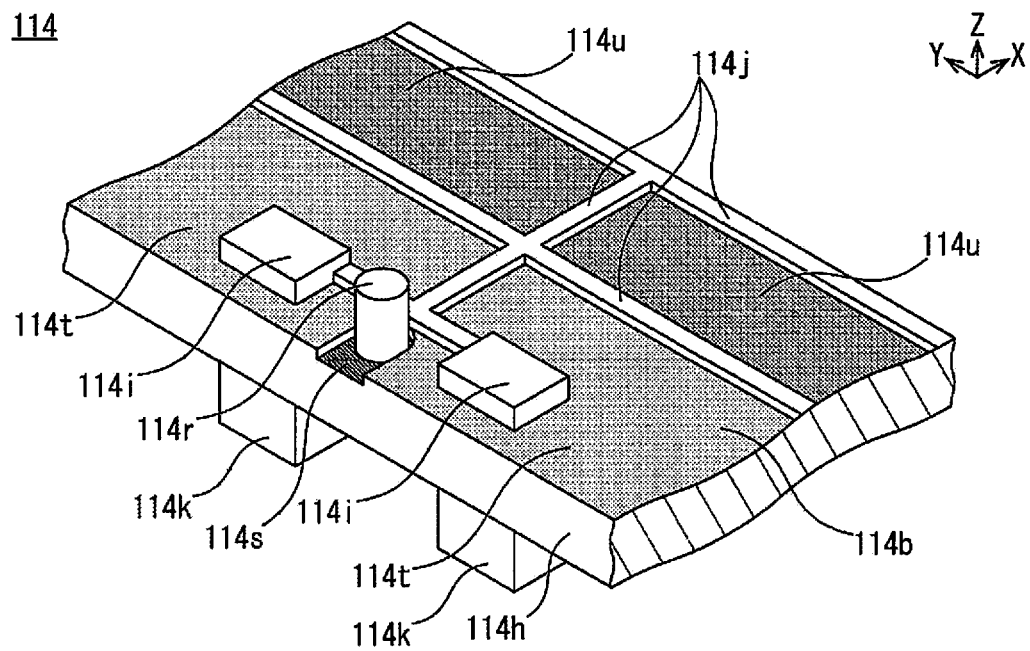
FIG. 9 is a perspective view illustrating the first spacer of FIG. 7.
Figure 10:
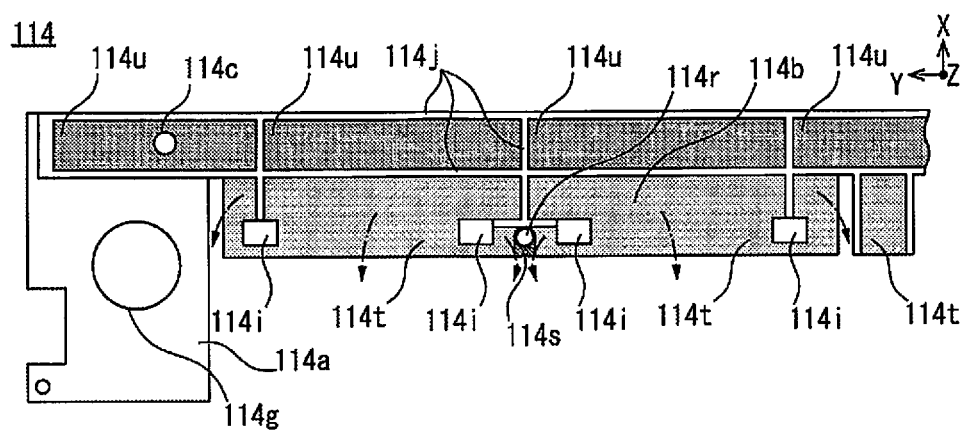
FIG. 10 is a top view illustrating the first spacer of FIG. 7.
Figure 11:
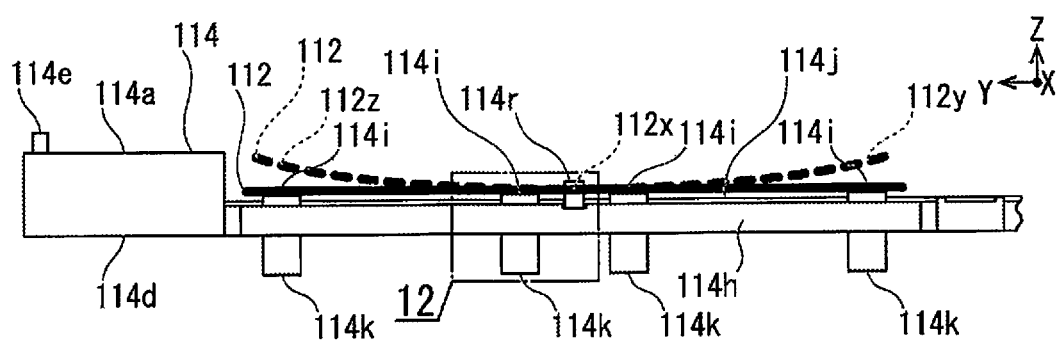
FIG. 11 is a side view schematically illustrating the first spacer of FIG. 7 to which is attached a proximal end portion of the electrode tab.
Figure 12:
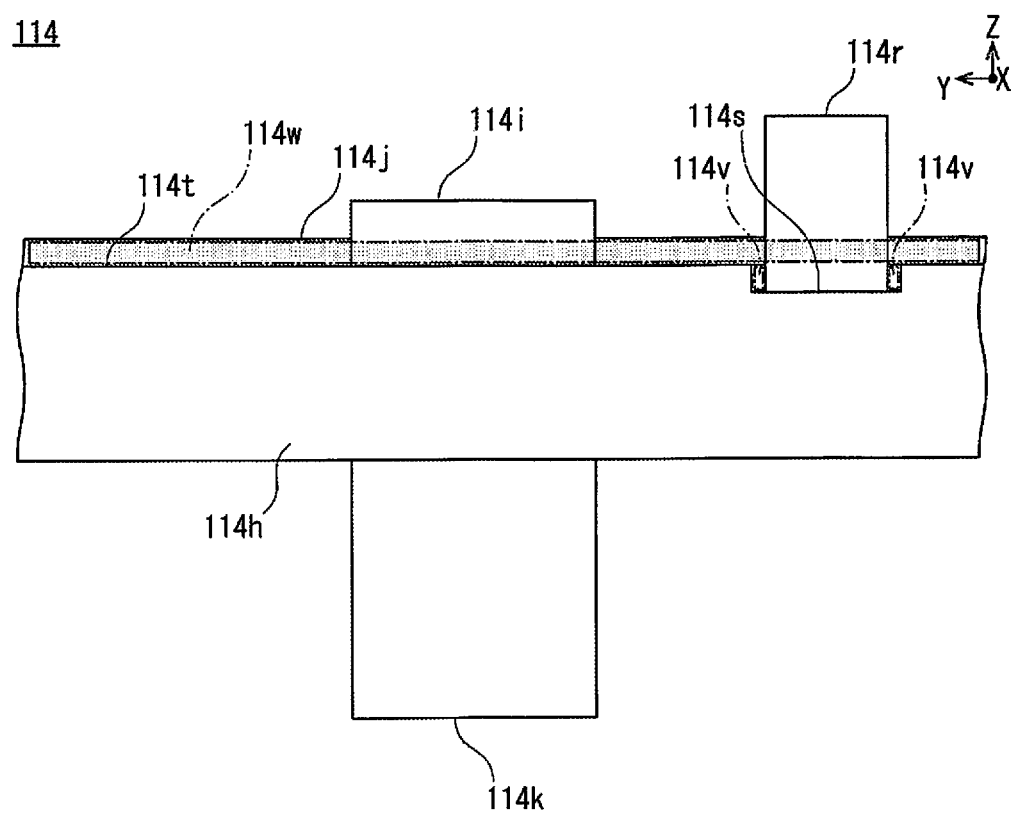
FIG. 12 is a side view illustrating the first spacer of FIG. 7.

FIG. 1 is a perspective view illustrating the battery pack 100 according to an embodiment. FIG. 2 is a perspective view illustrating a state in which a portion of a bus bar unit 130 (a protective cover 135, an anode side terminal 133, and a cathode side terminal 134) as well as a pressurizing unit 120 (an upper pressure plate 121, a lower pressure plate 122, and left and right side plates 123) are removed from the battery pack 100 shown in FIG. 1. FIG. 3A is a perspective view illustrating a cross section of a main part of a state in which a bus bar 132 is joined to electrode tabs 112 of stacked unit cells 110. FIG. 3B is an end surface view illustrating FIG. 3A from the side. FIG. 4 is a perspective view illustrating a state in which a bus bar holder 131 and the bus bars 132 are removed from a stacked body 110S illustrated in FIG. 2. FIG. 5 is a perspective view illustrating a state in which a first cell sub-assembly 110M and a second cell sub-assembly 110N shown in FIG. 4 are electrically connected by means of the bus bars 132. FIG. 6 is a perspective view illustrating a state in which the first cell sub-assembly 110M (three sets of unit cells 110 that are connected in parallel) shown in FIG. 4 is disassembled for each unit cell 110, and a first spacer 114 and a second spacer 115 are removed from one (the uppermost) unit cell 110 thereof. FIG. 7 is a perspective view illustrating a portion of the unit cell 110 and a portion of the first spacer 114. FIG. 8 is a side view illustrating the unit cell 110 and the first spacer 114 of FIG. 7. FIG. 9 is a perspective view illustrating the first spacer 114 of FIG. 7. FIG. 10 is a top view illustrating the first spacer 114 of FIG. 7. FIG. 11 is a side view schematically illustrating the first spacer 114 of FIG. 7 to which is attached a proximal end portion 112*c* of the electrode tab 112. FIG. 12 is a side view illustrating the first spacer 114 of FIG. 7.

With reference to FIGS. 3B, 7, and 12, in general, the spacer (first spacer 114) according to the embodiment is used with the unit cells 110, which have a cell body 110H, which includes a power-generating element 111 and is formed in a flat shape, as well as the electrode tab 112 (anode side electrode tab 112A and cathode side electrode tab 112K), which is drawn out from the cell body 110H. The first spacer 114 has a protrusion (boss 114*r*), a recess (first recess 114*s*), and an opening (first opening 114*v*). The boss 114*r* is formed in a protruding shape and is inserted into a hole 112*e* or a notch provided on the electrode tab 112 to guide the electrode tab 112. The first recess 114*s* is formed with a recessed shape and is separated from the electrode tab 112 around the base of the boss 114*r*. The first opening 114*v* allows a portion of the first recess 114*s* to communicate with a side surface.

With reference to FIGS. 3B, 7, and 12, in general, the battery pack 100 according to the embodiment comprises the unit cell 110, the spacer (first spacer 114), and the bus bar 132. The unit cell 110 comprises the cell body 110H, which includes the power-generating element 111 and is formed into a flat shape, and the electrode tabs 112 (anode side electrode tab 112A and cathode side electrode tab 112K), which are drawn out from the cell body 110H. The first spacer 114 includes the protrusion (boss 114*r*) formed with a protruding shape that is inserted into the hole 112*e* or a notch provided on the electrode tab 112 to guide the electrode tab 112, the recess (first recess 114*s*) formed with a recessed shape so as to be separated from the electrode tab 112 around the base of the boss 114*r*, and the opening (first opening 114*v*) that allows a portion of the first recess 114*s* to communicate with the side surface. The bus bar 132 electrically interconnects the electrode tabs 112 of the different unit cells 110.

A plurality of the battery packs 100 are mounted in a vehicle such as an electric vehicle and are used as a power source for driving a vehicle motor. The battery pack 100 is configured by electrically connecting a stacked body 110S, obtained by stacking a plurality of the unit cells 110 by means of a bus bar unit 130, in a state of pressurization by means of a pressurizing unit 120. Each configuration of the battery pack 100, including the spacers (first spacer 114 and second spacer 115), will be described below.

The configuration of the stacked body 110S will be described in detail.

The stacked body 110S is configured by alternately connecting in series the first cell sub-assembly 110M composed of three of the unit cells 110 that are electrically connected in parallel, and the second cell sub-assembly 110N composed of three of the unit cells 110 that are electrically connected in parallel, as illustrated in FIG. 4.

The first cell sub-assembly 110M corresponds to the three unit cells 110 that are positioned in the first row (lowermost row), the third row, the fifth row, and the seventh row (uppermost row) of the battery pack 100, as illustrated in FIG. 4. The second cell sub-assembly 110N corresponds to the three unit cells 110 that are positioned in the second row, the fourth row, and the sixth row of the battery pack 100, as illustrated in FIG. 4.

The first cell sub-assembly 110M and the second cell sub-assembly 110N are similarly configured. However, the first cell sub-assembly 110M and the second cell sub-assembly 110N are arranged such that three anode side electrode tabs 112A and three cathode side electrode tabs 112K are alternately positioned along the Z direction by interchanging the tops and bottoms of the three unit cells 110, as illustrated in FIGS. 4 and 5.

In the first cell sub-assembly 110M, all of the anode side electrode tabs 112A are positioned on the right side in the drawing, and all of the cathode side electrode tabs 112K are positioned on the left side in the drawing, as illustrated in FIGS. 4 and 5.

In the second cell sub-assembly 110N, all of the anode side electrode tabs 112A are positioned on the left side in the drawing, and all of the cathode side electrode tabs 112K are positioned on the right side in the drawing, as illustrated in FIGS. 4 and 5. If the tops and bottoms are simply interchanged every three of the unit cells 110, the orientations of the distal end portions 112*d* of the electrode tabs 112 will vary vertically in the Z direction. Therefore, as seen in FIG. 3, each of the distal end portions 112*d* is bent downwards, so that the orientations of all of the distal end portions 112*d* of the electrode tabs 112 of the unit cells 110 are aligned.

The unit cell 110 corresponds to a lithium-ion secondary battery, for example. A plurality of the unit cells 110 are connected in series in order to satisfy the drive voltage specification of the vehicle motor. A plurality of the unit cells 110 are connected in parallel in order to ensure the battery capacity and to extend the travel distance of the vehicle.

The unit cell 110 includes a cell body 110H, which includes a power-generating element 111 and is formed into a flat shape, an electrode tab 112 for exposing the power-generating element 111 to the outside, and a laminate film 113 for sealing the power-generating element 111, as illustrated in FIGS. 3A and 3B.

The power-generating element 111 is charged with electric power from an outdoor charging station or the like, and supplies driving power to the vehicle motor or the like by discharging the electric power. The power-generating element 111 is formed by stacking a plurality of sets of anodes and cathodes that are separated by separators.

The electrode tab 112 is for exposing the power-generating element 111 to the outside, as illustrated in FIGS. 3A to 8. The electrode tab 112 is composed of the anode side electrode tab 112A and the cathode side electrode tab 112K. The proximal end side of the anode side electrode tab 112A is joined to all of the anodes included in one of the power-generating element 111. The anode side electrode tab 112A has the form of a thin plate and is made of aluminum in accordance with the characteristics of the anode. The proximal end side of the cathode side electrode tab 112K is joined to all of the cathodes included in one of the power-generating element 111. The cathode side electrode tab 112K has the form of a thin plate and is made of copper in accordance with the characteristics of the cathode.

The electrode tab 112 has the form of an L, as illustrated in FIGS. 3B, 7, and 8. A proximal end portion 112*c* of the electrode tab 112 is supported by abutting portions (first abutting portion 114*i* and second abutting portion 114*j*) of the first spacer 114. The distal end portion 112*d* of the electrode tab 112 is bent downward in the Z direction, and faces a side surface (abutting surface 114*h*) of the first spacer 114.

The distal end portion 112*d* of the electrode tab 112 is not limited to the form of an L. For example, the electrode tab 112 may be U-shaped by further extending the distal end portion 112*d* and by folding back the extended portion toward the power-generating element 111. In addition, the proximal end portion 112*c* of the electrode tab 112 may have an undulating or curved form. The distal end portion 112*d* of the electrode tab 112 makes surface contact with the bus bar 132.

The electrode tab 112 has a hole 112*e* in a central portion 112*f* along the width direction, as illustrated in FIGS. 7 and 8. The hole 112*e* is formed in an elongated shape from the proximal end portion 112*c* to the distal end portion 112*d* of the electrode tab 112. The boss 114*r* of the first spacer 114 is inserted into the hole 112*e* of the electrode tab 112.

The laminate film 113 is configured in pairs and is for sealing the cell body 110H from above and below along the Z direction, as illustrated in FIGS. 3A and 3B. In the pair of laminate films 113, the anode side electrode tab 112A and the cathode side electrode tab 112K are drawn out to the outside from gaps between one end portions 113*a* thereof along the Y direction. The laminate film 113 includes a sheet-like metal layer 113M and a sheet-like insulating layer 113N that covers and insulates the metal layer 113M from both sides, as illustrated in FIG. 8.

The unit cells 110 are stacked, as illustrated in FIGS. 3(A), 3(B), and 4, in a state of support by means of a pair of spacers (first spacer 114 and second spacer 115), as illustrated in FIG. 6.

The pair of spacers (first spacer 114 and second spacer 115) are used to arrange the unit cells 110 at constant intervals along the Z direction, as illustrated in FIGS. 2 3A, and 3B. The first spacer 114 supports the unit cell 110 on the side provided with the electrode tab 112. The second spacer 115 supports the unit cell 110 on the side not provided with the electrode tab 112, so as to oppose the first spacer 114 in the X direction of the unit cell 110.

The first spacer 114 has the form of an elongated plate having recesses and protrusions, as illustrated in FIG. 6, and is made from reinforced plastic having an insulating property. The first spacer 114 is provided so as to oppose the side of the one end portions 113*a* of the pair of laminate films 113. The first spacer 114 supports one end of the unit cell 110 by means of the abutting portions (first abutting portion 114*i* and second abutting portion 114*j*), as illustrated in FIGS. 7 and 8.

The first spacer 114 has a pair of supporting surfaces 114*b* along the Y direction. The first spacer 114 has the abutting surface 114*h* on a side surface adjacent to the supporting surface 114*b* along the Z direction. The abutting surface 114*h* comes into contact with the distal end portion 112*d* of the electrode tab 112 and positions the distal end portion 112*d* along the X direction, as illustrated in FIG. 3B.

The first spacer 114 has a plurality of the protruding first abutting portions 114*i* along the Y direction of the supporting surface 114*b*, which protrude with a rectangular shape from the flat supporting surface 114*b* upward along the Z direction, as illustrated in FIGS. 7 to 9. The first abutting portions 114*i* support the proximal end portion 112*c* of the electrode tab 112 of the unit cell 110 from below. A total of four of the first abutting portions 114*i* are provided, two in the center of the supporting surface 114*b* away from each other, and one each at the two ends of the supporting surface 114*b*. The first abutting portions 114*i* support a central portion 112*f* of the electrode tab 112, one end portion 112*g* thereof, and the other end portion 112*h* thereof along the width direction.

The first spacer 114 has the protruding boss 114*r* at the center of each supporting surface 114*b*, as illustrated in FIGS. 7 to 9. The boss 114*r* is inserted into the hole 112*e* that is opened in the central portion 112*f* of the electrode tab 112 in order to regulate the position of the electrode tab 112. The boss 114*r* is swaged and fixed to a peripheral portion of the hole 112*e* of the electrode tab 112, as indicated by the dotted line in FIG. 8. The swaging of the boss 114*r* is carried out by heating and pressing the boss 114*r* to deform the boss into a hemispherical shape.

The first spacer 114 has the first recess 114*s* obtained by causing the supporting surface 114*b* positioned around the proximal end portion of the boss 114*r* to be annularly recessed around the boss 114*r*, as illustrated in FIGS. 7 and 9. A portion of the first recess 114*s* faces the abutting surface 114*h*. The first recess 114*s* opposes the electrode tab 112 of the unit cell 110, but is separated from the electrode tab 112.

The first spacer 114 has protruding second abutting portions 114*j*, which protrude annularly from each supporting surface 114*b* upward along the Z direction, as illustrated in FIGS. 7 to 9. The second abutting portions 114*j* partially support the one end portion 113*a* of the laminate film 113 of the unit cell 110. The second abutting portions 114*j* are lower in height than each of the first abutting portions 114*i*. The end portions of the annular second abutting portions 114*j* are connected to the respective first abutting portions 114*i*.

The first spacer 114 has second recesses 114*t* in portions partitioned by the annular second abutting portions 114*j*, as illustrated in FIGS. 7 to 9. The second recess 114*t* has a recessed shape, with the supporting surface 114*b* serving as the bottom surface and the second abutting portions 114*j* serving as the side surfaces. A part of the second recess 114*t* faces the abutting surface 114*h*. The second recess 114*t* faces the electrode tab 112 and the one end portion 113*a* of the laminate film 113 of the unit cell 110, while being separated therefrom.

The first spacer 114 has third recesses 114*u* in portions partitioned in four directions by the annular second abutting portions 114*j*, as illustrated in FIG. 7. The third recess 114*u* has a recessed shape with the supporting surface 114*b* serving as the bottom surface and the second abutting portions 114*j* serving as the side surfaces. The third recess 114*u* faces the electrode tab 112 and the one end portion 113*a* of the laminate film 113 of the unit cell 110, while being separated therefrom.

The gap extending from the recesses (first recess 114*s* and second recess 114*t*) of the first spacer 114 to the side surface (abutting surface 114*h*) between the first spacer 114 and the unit cell 110 functions as a drainage channel. As a result, the insulation resistance of the battery pack 100 does not deteriorate even if water droplets or a water film form due to condensation, and it is possible to prevent electric leakage and electrical short-circuiting between component members. The depths of the recesses (first recess 114*s* and second recess 114*t*) are appropriately determined based on the surface tension of water and the amount of water that is generated due to condensation. If it were mandatory to employ an insulating configuration in which an insulating member is provided between the first spacer 114 and the unit cell 110, the size of the battery pack 100 as well as the manufacturing cost would increase.

The first spacer 114 has a pair of connecting pins 114c that respectively protrude upward at both ends of the supporting surface 114b along the Y direction, illustrated in FIGS. 6 and 7. The pair of connecting pins 114c are cylindrical in form and are inserted into connecting holes 113c formed at both ends of the end portion 113a of the laminate film 113 along the Y direction, thereby positioning the unit cell 110.

In a plurality of the first spacers 114, an upper surface 114a of one first spacer 114 and a lower surface 114d of another first spacer 114 are in contact, as illustrated in FIG. 3B. The plurality of first spacers 114 are positioned relative to each other by fitting a cylindrical positioning pin 114e that protrudes from the upper surface 114a of one first spacer 114 into a positioning hole 114f that opens onto the lower surface 114d of another first spacer 114, as illustrated in FIG. 3B.

The first spacer 114 has rectangular parallelepiped-shaped pressurizing portions 114k that protrude downward in the Z direction so as to oppose the first abutting portions 114i along the Z direction, as illustrated in FIGS. 7 to 9. The electrode tab 112 that is supported by means of one first spacer 114 is sandwiched and fixed by means of the first abutting portions 114i of the one first spacer 114 positioned there below and the pressurizing portions 114k of another first spacer 114 positioned there above, and as illustrated in FIG. 3B.

The first spacer 114 is provided with locating holes 114g at both ends along the Y direction, as illustrated in FIGS. 6 and 7. Bolts for connecting and positioning a plurality of the battery packs 100 relative to each other along the Z direction are inserted in the locating holes 114g.

The second spacer 115 is configured by simplifying the first spacer 114, since it is not necessary for the second spacer to support the electrode tab 112. Similarly to the first spacer 114, the second spacer 115 includes an abutting portion (second abutting portion) for supporting the other end portion 113b of the laminate film 113, recesses (second recess and third recess) that oppose the other end portion 113b side of the unit cell 110, positioning pins 114e for positioning the second spacers relative to each other, connecting pins 115c for positioning the unit cell 110, and locating holes 115g, into which bolts for interconnecting and positioning a plurality of the battery packs 100 relative to each other are inserted, as illustrated in FIG. 6.

A hollow spacer 116 is a so-called collar. The hollow spacer 116 has a cylindrical form and is made from a metal possessing sufficient strength. The hollow spacer 116 is inserted into the locating hole 114g of the first spacer 114 and the locating hole 115g of the second spacer 115. A bolt for interconnecting and positioning a plurality of the battery packs 100 is inserted into the hollow spacer 116, thereby reinforcing the first spacer 114 and the second spacer 115.

The configuration of the pressurizing unit 120 will be described in detail.

The pressurizing unit 120 includes an upper pressure plate 121 and a lower pressure plate 122, which pressurize the power-generating element 111 of each of the unit cells 110 of the stacked body 110S from above and below, and a pair of side plates 123 that fix the upper pressure plate 121 and the lower pressure plate 122 in a state of pressurization of the stacked body 110S.

The upper pressure plate 121, together with the lower pressure plate 122, hold and sandwich the plurality of the unit cells 110 that constitute the stacked body 110S from above and below and pressurize the power-generating element 111 of each of the unit cells 110, as illustrated in FIGS. 1 and 2. The upper pressure plate 121 has the form of a plate with recesses and protrusions and is made from a metal possessing sufficient rigidity. The upper pressure plate 121 is provided on a horizontal plane. The upper pressure plate 121 has a pressurizing surface 121a that pressurizes the power-generating element 111 downwards, as illustrated in FIG. 2. The pressurizing surface 121a is formed flat, protruding downward from a central portion of the upper pressure plate 121. The upper pressure plate 121 has locating holes 121b, into which bolts for interconnecting the battery packs 100 are inserted. The locating holes 121b are through-holes, and formed at the four corners of the upper pressure plate 121.

The lower pressure plate 122 has the same shape as the upper pressure plate 121 and is provided so that the top and bottom of the upper pressure plate 121 can be inverted, as illustrated in FIG. 2. Like the upper pressure plate 121, the lower pressure plate 122 includes a pressurizing surface 122a that pressurizes the power-generating element 111 upwards, and locating holes 122b, into which bolts for connecting and positioning the battery packs 100 relative to each other along the Z direction are inserted.

The pair of side plates 123 are for fixing the upper pressure plate 121 and the lower pressure plate 122 in a state of pressurization of the stacked body 110S, as illustrated in FIGS. 1 and 2. That is, the pair of side plates 123 hold the interval between the upper pressure plate 121 and the lower pressure plate 122 constant. In addition, the pair of side plates 123 cover and protect the side surfaces of the stacked unit cells 110 along the X direction. The side plate 123 has the form of a flat plate and is made of metal. The pair of side plates 123 stand upright so as to face both side surfaces of the stacked unit cells 110 along the X direction. The pair of side plates 123 are welded to the upper pressure plate 121 and the lower pressure plate 122.

The configuration of the bus bar unit 130 will be described in detail.

The bus bar unit 130 includes a bus bar holder 131 that integrally holds a plurality of the bus bars 132, the bus bars 132 that electrically interconnect vertically adjacent electrode tabs 112 of the unit cells 110, an anode side terminal 133 that causes the anode side terminal ends of the plurality of the electrically connected unit cells 110 to oppose an external input-output terminal, a cathode side terminal 134 that causes the cathode side terminal ends of the plurality of the electrically connected unit cells 110 to oppose an external input-output terminal, and a protective cover 135 for protecting the bus bars 132, and the like.

The bus bar holder 131 is for integrally holding a plurality of the bus bars 132, as illustrated in FIGS. 2 and 4. The bus bar holder 131 integrally holds the plurality of the bus bars 132 in a matrix so as to oppose the electrode tab 112 of each of the unit cells 110 of the stacked body 110S. The bus bar holder 131 is made of resin having insulating properties, and has the form of a frame.

The bus bar holder 131 is respectively provided with a pair of columnar support portions 131a that stand upright along the Z direction, so as to be positioned on both sides of the longitudinal direction of the first spacers 114 that support the electrode tabs 112 of the unit cells 110, as illustrated in FIG. 4. The pair of columnar support portions 131a are fitted to the side surfaces of the first spacers 114. The pair of columnar support portions 131a have the form of an L when viewed along the Z direction and have the form of a plate that extends in the Z direction. The bus bar holder 131 is provided with a pair of auxiliary columnar support portions 131*b* at an interval to stand upright along the Z direction so as to be positioned in the vicinity of the center of the first spacer 114 in the longitudinal direction. The pair of auxiliary columnar support portions 131*b* have the form of a plate that extends in the Z direction.

The bus bar holder 131 includes insulating portions 131*c* that respectively protrude between adjacent bus bars 132 along the Z direction, as illustrated in FIG. 4. The insulating portions 131*c* have the form of a plate that extends in the Y direction. Each of the insulating portions 131*c* is provided horizontally between the columnar support portion 131*a* and the auxiliary columnar support portion 131*b*. The insulating portion 131*c* prevents discharge by insulating the space between bus bars 132 that are adjacent to each other along the Z direction.

The bus bar holder 131 may be configured by joining together the columnar support portions 131*a*, the auxiliary columnar support portions 131*b*, and the insulating portions 131*c*, which are independently formed, or can be configured by integrally molding the columnar support portions 131*a*, the auxiliary columnar support portions 131*b*, and the insulating portions 131*c*.

As shown in FIGS. 3A, 3B, 4 and 5, the bus bars 132 are for electrically interconnecting the vertically adjacent electrode tabs 112 of the unit cells 110. The bus bars 132 electrically connect the anode side electrode tab 112A of one unit cell 110 and the cathode side electrode tab 112K of another unit cell 110. For example, the bus bars 132 connect three vertically arranged anode side electrode tabs 112A of the first cell sub-assembly 110M and three vertically arranged cathode side electrode tabs 112K of the second cell sub-assembly 110N, as illustrated in FIG. 5.

That is, for example, the bus bars 132 connect the three anode side electrode tabs 112A of the first cell sub-assembly 110M in parallel and connect the three cathode side electrode tabs 112K of the second cell sub-assembly 110N in parallel, as illustrated in FIG. 5. Moreover, the bus bars 132 connect the three anode side electrode tabs 112A of the first cell sub-assembly 110M and the three cathode side electrode tabs 112K of the second cell sub-assembly 110N in series. The bus bars 132 are laser-welded to the anode side electrode tab 112A of one unit cell 110 and the cathode side electrode tab 112K of another unit cell 110.

As shown in FIGS. 3A and 4, the bus bar 132 is formed by joining the anode side bus bar 132A and the cathode side bus bar 132K. The anode side bus bar 132A and the cathode side bus bar 132K have the same shape, each having the form of an L. The bus bar 132 is integrally formed by a joint portion 132*c*, which is formed by joining one bent end of the anode side bus bar 132A to one bent end of the cathode side bus bar 132K, as illustrated in FIGS. 3A and 4. The anode side bus bar 132A and the cathode side bus bar 132K, which constitute the bus bar 132, are provided with side portions 132*d* that are joined to the bus bar holder 131 at both ends in the Y direction, as illustrated in FIG. 4.

The anode side bus bar 131A is made of aluminum in the same manner as the anode side electrode tab 112A of the unit cell 110. The cathode side bus bar 132K is made of copper, in the same manner as the cathode side electrode tab 112K of the unit cell 110. The anode side bus bar 132A and the cathode side bus bar 132K, which are made from different metals, are joined to each other by means of ultrasonic bonding to form the joint portion 132*c*.

Of the bus bars 132 arranged in the form of a matrix, the bus bar 132 positioned on the upper right in the drawing in FIG. 4 corresponds to the anode side terminal ends of 21 of the unit cells 110 (3 parallel 7 series) and is composed of only the anode side bus bar 132A. This anode side bus bar 132A is laser-welded to the anode side electrode tabs 112A of the three uppermost unit cells 110 of the stacked unit cells 110.

Of the bus bars 132 arranged in the form of a matrix, the bus bar 132 positioned on the lower left in the drawing in FIG. 4 corresponds to the cathode side terminal ends of 21 unit cells 110 (3 parallel 7 series) and is composed of only the cathode side bus bar 132K. The cathode side bus bar 132K is laser-welded to the cathode side electrode tabs 112K of the three lowermost unit cells 110 of the stacked unit cells 110.

As shown in FIGS. 1 and 2, the anode side terminal 133 causes the anode side terminal ends of the plurality of the electrically connected unit cells 110 to oppose an external input/output terminal. The anode side terminal 133 is joined to the anode side bus bar 132A positioned on the upper right in the drawing, from among the bus bars 132 arranged in a matrix, as illustrated in FIG. 2. The anode side terminal 133 has the form of a plate, both ends of which are bent, and is made from a conductive metal.

The cathode side terminal 134 causes the cathode side terminal ends of the plurality of the electrically connected unit cells 110 to oppose an external input/output terminal, as illustrated in FIGS. 1 and 2. The cathode side terminal 134 is joined to the cathode side bus bar 132K positioned on the lower left in the drawing, from among the bus bars 132 arranged in a matrix, as illustrated in FIG. 2. The cathode side terminal 134 has the shape of the anode side terminal 133, with the top and bottom inverted.

As shown in FIGS. 1 and 2, the protective cover 135 is provided for protecting the bus bars 132, and the like. That is, the protective cover 135 integrally covers the plurality of the bus bars 132 to thereby prevent each of the bus bars 132 from coming into contact with other members, etc., to cause electrical short-circuiting. The protective cover 135 is made from a plastic having an insulating property, where one end 135*b* and the other end 135*c* of a side surface 135*a* standing upright along the Z direction are bent claw-like in the X direction, as illustrated in FIG. 2.

The protective cover 135 covers each of the bus bars 132 with the side surface 135*a*, while sandwiching and fixing the bus bar holder 131 from above and below with the one end 135*b* and the other end 135*c*. The protective cover 135 has a first opening 135*d*, which is a rectangular hole for exposing the anode side terminal 133 to the outside, and a second opening 135*e*, which is a rectangular hole for exposing the cathode side terminal 134 to the outside on the side surface 135*a*.

The action and effects of the above-described embodiment will be described below.

The first spacer 114 is used for the unit cell 100 that has a cell body 110H, which includes the power-generating element 111 and has a flat shape and an electrode tab 112 extending out from the cell body 110H. The first spacer 114 has the boss 114*r*, the first recess 114*s*, and the first opening 114*v*. The boss 114*r* has a protruding shape and is inserted into a hole 112*e* or a notch provided on the electrode tab 112 to guide the electrode tab 112. The first recess 114*s* has a recessed shape and is separated from the electrode tab 112 around the base of the boss 114*r*. The first opening 114*v* allows a portion of the first recess 114*s* to communicate with a side surface.

The battery pack 100 comprises the unit cell 110, the spacer (first spacer 114) and the bus bar 132. The unit cell 110 comprises the cell body 110H, which includes the power-generating element 111 and is formed into a flat shape, and the electrode tab 112 (anode side electrode tab 112A and cathode side electrode tab 112K), which is extend out from the cell body 110H. The first spacer 114 includes the protrusion (boss 114r), which has a protruding shape that is inserted into the hole 112e or a notch provided on the electrode tab 112 to guide the electrode tab 112, the recess (first recess 114s), which has a recessed shape so as to be separated from the electrode tab 112 around the base of the boss 114r, and the opening (first opening 114v), which allows a portion of the first recess 114s to communicate with the side surface. The bus bar 132 electrically interconnects the electrode tabs 112 of the different unit cells 110.

As shown in FIG. 12, by means of the first spacer 114 configured in this manner, a portion of the first recess 114s is exposed to the side surface (abutting surface 114h) via the first opening 114v. That is, the battery pack 100 including the first spacer 114 and the first spacer 114 can discharge the water droplets and water films, which are generated due to condensation, from the first recess 114s to the outside via the first opening 114v. The water droplets and the water films are discharged to the outside as liquid or are vaporized and discharged to the outside via the first opening 114v. Thus, the first spacer 114 and the battery pack 100 including the first spacer 114 can suppress electrical leakage caused by condensation.

As shown in FIG. 9, the first spacer 114 is formed by digging down the first recess 114s more deeply than around the base of the boss 114r, but it is not necessary that the recess be large. Accordingly, it is possible to easily produce the first spacer 114 without impairing the formability thereof (in particular, changes to the external dimensions during cooling at the time of processing are extremely small).

Moreover, it is possible to configure the battery pack 100 by tightly stacking a plurality of the first spacers 114 such that the upper surface 114a of one first spacer 114 and the lower surface 114d of another first spacer 114 are in contact, as illustrated in FIG. 3B. In particular, the battery pack 100 is capable of preventing the water droplets and water films that accumulate in the first spacer 114 from adhering to the metal hollow spacer 116 inserted in the locating hole 114g of the first spacer 114, for example, to form a column of water and from being transported to a ground in the vehicle, in which the battery pack 100 is disposed, via the hollow spacer 116 that extends vertically. Accordingly, the battery pack 100 can prevent deterioration of the insulation resistance. In this manner, the battery pack 100 can suppress electrical leakage that occurs, for example, via the hollow spacer 116, or the like, having a high conductivity.

The first spacer 114 preferably further comprises abutting portions (first abutting portion 114i and second abutting portion 114j) that protrude in the same direction as the boss 114r and that abut the unit cell 110.

According to the first spacer 114 configured in this manner, it is possible to configure an opening (second opening 114W) from the second recess 114t, which is relatively lower than the first abutting portion 114i and the second abutting portion 114j toward the side surface (abutting surface 114h) in the periphery of the first abutting portion 114i and the second abutting portion 114j, as shown in FIG. 12. That is, it is possible to discharge the water droplets and water films, which are generated due to condensation, from the second recess 114t to the outside via the second opening 114W facing the side surface (abutting surface 114h). Therefore, the first spacer 114 is capable of further suppressing electrical leakage caused by condensation.

In addition, as shown in FIG. 9, the first spacer 114 is formed by digging down the second recess 114t more deeply than the first abutting portion 114i and the second abutting portion 114j. It is not necessary to expand the outer shape itself of the first spacer 114 in either the horizontal direction or the vertical direction. In this manner, the first spacer 114 is able to discharge water to the outside and to suppress the generation of a conduction path due to water droplets and water films that are generated due to condensation by means of the second recess 114t, without providing extra space (extra space for ensuring creepage distance or spatial distance) that could be disadvantageous in terms of improving volume density.

In addition, as shown in FIG. 9, the first spacer 114 is formed by digging down the second recess 114t more deeply than the first abutting portion 114i and the second abutting portion 114j, but it is not necessary that the recess be large. Accordingly, it is possible to easily produce the first spacer 114 without impairing the formability thereof (in particular, changes to external dimensions during cooling at the time of processing are extremely small).

The first abutting portion 114i preferably abuts the one end portion 112g, the central portion 112f, and the other end portion 112h of the electrode tab 112 along the width direction.

By means of the first spacer 114 configured in this manner, when the boss 114r is swaged and fixed to the hole 112e portion provided at the central portion 112f of the electrode tab 112, for example, it is possible to prevent the swaged portion from distorting and causing the two ends of the electrode tab 112 (one end portion 112g and another end portion 112h) to lift up from the first spacer 114 and be deformed. That is, because the first abutting portions 114i partially support the central portion 112f, the one end portion 112g, and the other end portion 112h of the electrode tab 112, the distortion of the electrode tab 112 caused by the swaging is not transmitted to the two ends (one end portion 112g and other end portion 112h) of the electrode tab 112 via the first abutting portions 114i of the first spacer 114; thus, it is possible to confine the distortion of the electrode tab 112 to the central portion 112f. Therefore, when the electrode tab 112 is machined by means of laser irradiation, it is also possible to prevent cases in which the laser cannot irradiate appropriately (so-called blank beating of the laser) due to positional displacement of the electrode tab 112. Moreover, the first spacer 114 can discharge the water droplets and water films, which are generated due to condensation, to the outside via the gaps in the first abutting portions 114i (the gap positioned between the central portion 112f and the one end portion 112g of the electrode tab 112 and the gap positioned between the central portion 112f and the other end portion 112h). Therefore, according to the first spacer 114, it is possible to keep the distortion of the electrode tab 112 caused by the swaging of the boss 114r localized, thereby preventing deformation of the entire electrode tab 112, as well as to suppress electrical leakage caused by condensation while securely holding the first spacer 114 and the electrode tab 112.

At least a portion of the second abutting portion 114j of the first spacer 114 is preferably formed annularly.

By means of the first spacer 114 configured in this manner, it is possible to store the water droplets and water films, which are generated due to condensation, in the third recess 114u that is surrounded by the annularly formed second abutting portion 114j, and then to vaporize and discharge the water droplets and water films to the outside from the gap between the unit cell 110 and the first spacer 114. That is, the third recess 114u, which is surrounded by the second abutting portion 114j, functions as a pocket for the temporary storage of water. Therefore, the first spacer 114 is capable of suppressing electrical leakage caused by condensation.

Other than the foregoing, various modifications to the present invention based on the configurations described in the Claims are possible, which also belong to the scope of the present invention.

In the spacer (for example, the first spacer 114), the side surface for exposing a portion of the recesses (first recess 114s and second recess 114t) is not limited to the side surface (abutting surface 114h) along the Y direction (transverse direction) of the unit cell 110, and may be a side surface along the X direction (longitudinal direction) of the unit cell 110.

The present application is based on Japanese Patent Application No. 2016-187481 filed on Sep. 26, 2016, and the contents disclosed therein have been referenced and fully incorporated herein.

The invention claimed is:

1. A battery pack comprising:
  a unit cell that has a cell body including a power-generating element and being formed to have a flat shape, and an electrode tab extending out from the cell body, the electrode tab having a distal end portion that is bent, the electrode tab further having a hole or a notch that is formed on the electrode tab, the hole or notch being formed in an elongated shape and extending from a proximal end portion of the cell body to the distal end portion of the electrode tab;
  a spacer that includes
    a protrusion having a protruding shape protruding in a stacking direction of the unit cell that is inserted into the hole or notch of the electrode tab to guide the electrode tab,
    a recess having a recessed shape so as to be separated from the electrode tab around the base of the protrusion,
    an abutting portion that contacts the electrode tab when the protrusion is inserted into the hole or notch; and
    an opening that allows a portion of the recess to communicate with the hole or notch when the protrusion is inserted into the hole or notch; and
  a bus bar that electrically interconnects the electrode tab to an electrode of a different unit cell.

2. The battery pack according to claim 1, wherein the abutting portion protrudes in a same direction as the protrusion and is configured to abut the unit cell.

3. The battery pack according to claim 2, wherein the abutting portion abuts one end portion of the electrode tab, a central portion of the electrode tab, and another end portion of the electrode tab in a width direction of the electrode tab.

4. The battery pack according to claim 2, wherein at least a portion of the abutting portion has an annular shape.

* * * * *